US011151385B2

(12) United States Patent
Iyer et al.

(10) Patent No.: US 11,151,385 B2
(45) Date of Patent: Oct. 19, 2021

(54) SYSTEM AND METHOD FOR DETECTING DECEPTION IN AN AUDIO-VIDEO RESPONSE OF A USER

(71) Applicant: RTScaleAI Inc, Cedar Park, TX (US)

(72) Inventors: Vivek Iyer, Austin, TX (US); Peter Walker, Cedar Park, TX (US)

(73) Assignee: RTScaleAI Inc, Cedar Park, TX (US)

( * ) Notice: Subject to any disclaimer, the term of this patent is extended or adjusted under 35 U.S.C. 154(b) by 121 days.

(21) Appl. No.: 16/722,083

(22) Filed: Dec. 20, 2019

(65) Prior Publication Data
US 2021/0192221 A1 Jun. 24, 2021

(51) Int. Cl.
*G06K 9/00* (2006.01)
*G10L 15/02* (2006.01)
(Continued)

(52) U.S. Cl.
CPC ..... *G06K 9/00744* (2013.01); *G06K 9/00281* (2013.01); *G06K 9/00315* (2013.01);
(Continued)

(58) Field of Classification Search
CPC ........... G06K 9/00744; G06K 9/00281; G06K 9/3233; G06K 9/6201; G06K 9/00335;
(Continued)

(56) References Cited

U.S. PATENT DOCUMENTS 8,992,227 B2    3/2015  Al Bandar et al.
9,378,366 B2 *  6/2016  Tegreene ......... H04N 21/44218
(Continued)

FOREIGN PATENT DOCUMENTS

CN    109145817 A     1/2019
EP       3030151 A1    6/2016
WO   2016049757 A1    4/2016

*Primary Examiner* — Charlotte M Baker
(74) *Attorney, Agent, or Firm* — Ziegler IP Law Group, LLC

(57) ABSTRACT

A method for (of) detecting deception in an Audio-Video response of a user, using a server, in a distributed computing architecture, characterized in that the method including: enabling an Audio-Video connection with a user device upon receiving a request from a user; obtaining, from the user device, an Audio-Video response of the user corresponding to a first set of questions that are provided to the user by the server; extracting audio signals and video signals from the Audio-Video response; detecting an activity of the user by determining a plurality of Natural Language Processing (NLP) features from the extracted audio signals by (i) performing a speech to text translation and (ii) extracting the plurality of NLP features from the translated text, and determining a plurality of speech features from the extracted audio signals by (i) splitting the extracted audio signals into a plurality of short interval audio signals and (ii) extracting the plurality of speech features from the plurality of short interval audio signals; aggregating (i) the plurality of NLP features to obtain a plurality of temporal NLP features and (ii) the plurality of speech features to obtain a plurality of temporal speech features; aggregating the plurality of temporal NLP features and the plurality of temporal speech features to obtain first temporal aggregated features; detecting a plurality of micro-expressions of the user by splitting extracted video signals into a plurality of short fixed-duration video signals, detecting a plurality of Region Of Interest (ROI) in the plurality of short fixed-duration video signals, and comparing the plurality of detected ROI with video signals annotated with micro-expression labels that are stored in a database to detect the plurality of micro-expressions of the user in the plurality of short fixed-duration video signals; tracking and determining a gesture of the user from the extracted video signals; aggregating the (Continued)

plurality of micro-expressions and the gesture of the user to obtain second temporal aggregated features; aggregating the first temporal aggregated features and the second temporal aggregated features to obtain final temporal aggregated features; and detecting, using a machine learning model, a deception in the Audio-Video response based on the final temporal aggregated features.

15 Claims, 13 Drawing Sheets

(51) Int. Cl.
      *G10L 15/22*     (2006.01)
      *G10L 15/18*     (2013.01)
      *G06K 9/32*      (2006.01)
      *G06N 5/04*      (2006.01)
      *G10L 21/0232*   (2013.01)
      *G10L 25/63*     (2013.01)
      *G10L 25/90*     (2013.01)
      *G06K 9/62*      (2006.01)
      *G06N 20/00*     (2019.01)

(52) U.S. Cl.
     CPC ....... *G06K 9/00335* (2013.01); *G06K 9/3233* (2013.01); *G06K 9/6201* (2013.01); *G06N 5/04* (2013.01); *G06N 20/00* (2019.01); *G10L 15/02* (2013.01); *G10L 15/18* (2013.01); *G10L 15/22* (2013.01); *G10L 21/0232* (2013.01); *G10L 25/63* (2013.01); *G10L 25/90* (2013.01)

(58) Field of Classification Search
     CPC ...... G06K 9/00315; G06N 5/04; G06N 20/00; G10L 15/02; G10L 15/22; G10L 15/18; G10L 25/90; G10L 25/63; G10L 21/0232
     USPC .......................................................... 382/118
     See application file for complete search history.

(56) References Cited

U.S. PATENT DOCUMENTS

| | | | |
|---|---|---|---|
| 10,121,064 B2 | 11/2018 | Hong et al. | |
| 10,154,810 B2 | 12/2018 | Tzvieli et al. | |
| 10,423,773 B1 | 9/2019 | Huang | |
| 2005/0021348 A1* | 1/2005 | Chan | G06Q 10/067 706/45 |
| 2009/0287837 A1* | 11/2009 | Felsher | G06Q 10/10 709/229 |
| 2020/0065394 A1* | 2/2020 | Calderon | G06K 9/6267 |
| 2020/0251190 A1* | 8/2020 | Glasner | A61B 5/4839 |

* cited by examiner

SYSTEM AND METHOD FOR DETECTING DECEPTION IN AN AUDIO-VIDEO RESPONSE OF A USER

TECHNICAL FIELD

The present disclosure relates generally to a system that detects deception in an Audio-Video response of a user in real-time by analyzing multiple modalities of the Audio-Video response using a multi-modal algorithm in a distributed computing architecture; and more specifically, the present disclosure relates to a method for (of) detecting deception in an Audio-Video response of a user. Moreover, the aforesaid system employs, when in operation, machine learning techniques for detecting deception in the Audio-Video response of the user by analyzing multiple modalities of the Audio-Video response. Furthermore, the present disclosure is concerned with computer program products comprising a non-transitory computer readable storage medium having computer-readable instructions stored thereon, the computer-readable instructions being executable by a computerized device comprising processing hardware to execute the aforesaid methods.

BACKGROUND

Deception is common in our daily lives. Lying is a complex task, which involves both mental effort and emotional impact from a person. Lying's influence and self-expression on different people in different situations vary significantly. While lying, the person may experience stress, anger, fear, and other emotions, as well as cognitive load associated with a task of lying, increased concentration associated with being uncooperative and trying not to get caught or other mental efforts. The person may experience one of these signs or several. However, not only liars experience these signs. Some of these signs may be experienced by truth telling people under investigation conditions. In addition, some of these signs may be experienced by the person, who is not lying and is stressed for other reasons. These are some of the reasons that it is difficult to identify deception at the time of verifying an identity of the person, and documentation of the person etc. for security in several applications.

Nowadays, multiple high value workflow and asset-oriented verticals or industries such as financial industry, Identity and Authentication industry, Insurance industry, Medical industry, Legal industry etc. are becoming digital and distributed in nature. Most of the above verticals or industries are highly reliant on identity, security and distributed nature of transactions. For example, financial industries for real-time payments, banking verifications etc. are highly reliant on identity and document verification for security and mostly those verification are performed manually. In current scenario, the person has to do manual verification to setup a password for a banking application which in turn relies on Electronic Mails, Short Messaging Service or any of the hackable modalities. Currently, there is no solution for solving increasing level of identity fraud for increasingly distributed and digital transformation-oriented consumers. This leads to inventing several artificial inference methods for deception detection in multiple stages of the workflow in a distributed process.

Existing approaches detect deception of a statement of a person based on variation in physiological signals of the person at the time of the statement. Common drawback of these approaches is that they provide a false positive result sometimes as the physiological signal of the truth telling person may vary under various stress conditions. Hence, these approaches are not reliable for deception detection in digital and distributed transactions.

Existing systems for deception detection attempt to analyze video and/or audio response of the person. One such system detects deception using information available in the video response of the person. Another existing system detects deception using machine learning approaches to assess a performance of extracted features from the audio response of the person.

Another existing system focuses on Micro-expression spotting and Micro-expression recognition in a video sequence for deception detection. The Micro-expression spotting focuses on finding an occurrence of Micro-expressions (MEs) in the video sequence while the Micro-expression recognition assigns an emotion class label to an ME sequence. The Micro-expression spotting automatically detects a temporal interval of a micromovement in a sequence of video frames. The Micro-expression recognition comprises a number of pre-processing techniques such as pre-processes, face landmark detection and tracking, face registration and face region retrieval for recognizing micro-expression. U.S. Pat. No. 8,992,227 discloses methods and apparatus for analysing the behaviour of a subject using artificial intelligence. The method for analyzing the behavior of a subject comprising the steps of: making one or more measurements or observations of the subject; coding the measurements or observations into a plurality of channels; and analyzing the channels using artificial intelligence, in order to output information relating to the psychology of the subject. However, the method/system does not detect micro-expressions to accurately detect the behaviour of the subject/deception.

Ep patent 3030151 discloses a system and method for emotion detection and more specifically to an image-capture based system and method for detecting invisible human emotion and genuine emotions felt by an individual. The system provides a remote and non-invasive approach by which to detect invisible emotion with a high confidence. The system enables monitoring of haemoglobin concentration changes by optical imaging and related detection systems. This system is limited to detect the human emotions and does not detect micro-expression of the human, which is important for accurately detect the behaviour of the subject/deception.

IN patent 6976/CHE/2015 discloses a fraud detection system and method that can detect and prevent fraudulent customers within a Telecommunication Network. The fraud detection system is mainly focused on detecting fraud from a bank perspective and does not involve multiple modalities (e.g. a video, an audio, a biometric, micro-expressions etc.) for detecting deception.

U.S. patent Ser. No. 10/121,064 discloses a machine vision system for performing behavior detection using 3D tracking and machine learning, and more specifically, in some embodiments, to the detection of behavior of multiple subjects using 3D tracking. The machine vision system relies on the input sensor to provide data for detecting a behavior of a user. However, the machine vision system does not detect micro-expression of the human, which is important for accurately detect the behaviour of the human/deception.

U.S. patent Ser. No. 10/154,810 discloses a system and method that identify a typical behavior of a user. The system includes an eye tracker to perform tracking of a user's gaze while viewing items, an inward-facing head-mounted thermal camera to take thermal measurements of a region of interest on the face (THROI) of the user, and a computer. The system uses infra-red/thermal sensor to detect the behavior of the user. However, the system does not track other parts of face to detect micro-expressions of the user, which is important for accurately detect the behaviour of the user/deception.

Chinese patent 109145817 discloses a kind of face In vivo detection recognition methods, to solve the photograph in face identification method Piece deceptive practices can effectively judge the difference of living body faces and image/video face. The method uses an SVM classifier for facial recognition of a user.

U.S. Pat. No. 9,378,366 discloses a system and method for monitoring deceptive indicia in communications content may implement operations including, but not limited to: receiving one or more signals associated with communication content provided by a first participant in a communications interaction; detecting one or more indicia of deception associated with the one or more signals associated with the communication content; and providing a notification associated with the one or more indicia of deception associated with the communication content to a second participant in the communications interaction receiving the communication content.

U.S. patent Ser. No. 10/423,773 discloses systems and methods are provided for calculating authenticity of a human user. One method comprises receiving, via a network, an electronic request from a user device, instantiating a video connection with the user device; generating, using a database of questions, a first question; providing, via the network, the generated question to the user device; analyzing video and audio data received via the connection to extract facial expressions, calculating, using convolutional neural networks, first data and second data corresponding predetermined emotions based on facial expressions and audio data; generating candidate emotion data using the first and second data; determining whether the candidate emotion data predicts a predetermined emotion, and generating a second question to collect additional data for aggregating with the first and second data or determining the authenticity of the user and using the determined authenticity to decide on the user request. However, none of the above prior art effectively detect the deception in a video-audio response of the person based on multiple modalities (e.g. a video, an audio, a biometric, micro-expressions etc.).

One common drawback to aforementioned known methods and systems is that it detects deception in at least one of video or audio response of the person. Hence, the output of the aforementioned known methods and systems is not reliable in digital and distributed transactions.

Therefore, there arises a need to address the aforementioned technical drawbacks in existing technologies to efficiently detect the deception in a video and audio response of a user.

SUMMARY

The present disclosure seeks to provide an improved system that, when in operation, detects deception in an Audio-Video response of a user using a server, in a distributed computing architecture.

According to a first aspect, there is provided a method for (of) detecting deception in an Audio-Video response of a user, using a server, in a distributed computing architecture, characterized in that the method comprising:

enabling an Audio-Video connection with a user device upon receiving a request from a user;

obtaining, from the user device, an Audio-Video response of the user corresponding to a first set of questions that are provided to the user by the server;

extracting audio signals and video signals from the Audio-Video response;

detecting an activity of the user by determining a plurality of Natural Language Processing (NLP) features from the extracted audio signals by (i) performing a speech to text translation and (ii) extracting the plurality of NLP features from the translated text; and determining a plurality of speech features from the extracted audio signals by (i) splitting the extracted audio signals into a plurality of short interval audio signals and (ii) extracting the plurality of speech features from the plurality of short interval audio signals;

aggregating (i) the plurality of NLP features to obtain a plurality of temporal NLP features and (ii) the plurality of speech features to obtain a plurality of temporal speech features;

aggregating the plurality of temporal NLP features and the plurality of temporal speech features to obtain first temporal aggregated features;

detecting a plurality of micro-expressions of the user by splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

tracking and determining a gesture of the user from the extracted video signals;

aggregating the plurality of micro-expressions and the gesture of the user to obtain second temporal aggregated features;

aggregating the first temporal aggregated features and the second temporal aggregated features to obtain final temporal aggregated features; and detecting, using a machine learning model, a deception in the Audio-Video response based on the final temporal aggregated features.

The aspects of the disclosed embodiments are of advantage in that improved, scalable and automatic deception detection of the Audio-Video response of the user optionally expedites multiple workflows in digital and distributed process in real-time and enables security for increasingly distributed and digital transformation-oriented users.

Optionally, the method comprises preprocessing the audio and the video signals that are obtained from the user device to cancel noise from the audio and the video signals.

Optionally, the method comprises providing the Audio-Video response of the user to a plurality of reviewers to provide feedback on the Audio-Video response as deceptive or truthful.

Optionally, the Audio-Video response comprises metadata including a time at which the user provides the Audio-Video response and data on the first set of questions that are provided to the user.

Optionally, the method comprises providing a second set of questions to the user using a knowledge repository; and detecting, using the machine learning model, deception in Audio-Video response of the user corresponding to the second set of questions.

Optionally, the machine learning model comprises a multi-modal algorithm, wherein the machine learning model is trained using (i) real-time datasets that comprises deceptive and truthful responses of one or more users, and (ii) the audio-video response from the user for the first set of questions or a feedback from a reviewer on the audio-video response of the user for the first set of questions, wherein the machine learning model is configured to receive the Audio-Video response of the user and to output as deceptive or truthful Audio-Video response.

Optionally, the method comprises repeating the first set of questions to the user to reinforce the deception detection by (i) compensating latency and real-time inference accuracy and (ii) turning on or off one or more modalities that modulate between more modalities and less modalities with higher fidelity of accuracy if the detected deception of the Audio-Video response corresponding to the first set of questions is not satisfied. In an embodiment, the fidelity of each modality is scalable in terms of quality (e.g. audio bitrate, video bitrate etc.)

Optionally, the method comprises scaling up or down the computation of each modality with respect to the user device and the server, wherein the scalability of each modality is determined based on the final temporal aggregated features extracted from the Audio-Video response.

Optionally, the user device comprises at least one of (i) a virtual bot or (ii) an assist bot.

Optionally, the plurality of Natural Language Processing features comprises at least one of (i) a number of words per second or (ii) a change in syntax of text.

Optionally, the plurality of speech features comprises at least one of (i) a speech tone or (ii) a frequency change and a pause rate change of speech.

Optionally, the plurality of micro-expressions is determined by analyzing at least one of left side eyebrows, right side eyebrows, a left upper eyelid, a left lower eyelid, a right upper eyelid, a right lower eyelid or cheek muscles of the user in the plurality of short fixed-duration video signals.

Optionally, the method further comprises storing the detected deception associated with the Audio-Video response of the user as reference data in the knowledge repository to ascertain deceptiveness of the user in future.

According to a second aspect, there is provided a system for (of) detecting deception in an Audio-Video response of a user in a distributed computing architecture, characterized in that the system comprising:

a server that comprises a processor that executes a machine learning algorithm, wherein at least one storage medium is coupled to the server and contains a knowledge repository of the user data;

at least one input interface that receives a request from a user device associated with a user and provides the request to the server to enable an Audio-Video connection between the user device and the server; and at least one output interface that provides detected deception associated with the Audio-Video response of the user;

wherein the server provides a first set of question to the user through a user interface of the user device by interrogating the knowledge repository and receives an Audio-Video response of the user corresponding to the first set of questions through the at least one input interface to extract audio signals and video signals from the Audio-Video response;

detect an activity of the user by:

determining a plurality of Natural Language Processing (NLP) features from the extracted audio signals by (i) performing a speech to text translation and (ii) extracting the plurality of NLP features from the translated text; and determining a plurality of speech features from the extracted audio signals by (i) splitting the extracted audio signals into a plurality of short interval audio signals and (ii) extracting the plurality of speech features from the plurality of short interval audio signals;

aggregate (i) the plurality of NLP features to obtain a plurality of temporal NLP features and (ii) the plurality of speech features to obtain a plurality of temporal speech features;

aggregate the plurality of temporal NLP features and the plurality of temporal speech features to obtain first temporal aggregated features;

detect a plurality of micro-expressions of the user by:

splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

track and determine a gesture of the user from the extracted video signals;

aggregate the plurality of micro-expressions and the gesture of the user to obtain second temporal aggregated features;

aggregate the first temporal aggregated features and the second temporal aggregated features to obtain final temporal aggregated features; and detect, using a machine learning model, a deception in the Audio-Video response based on the final temporal aggregated features by interrogating the knowledge repository.

According to a third aspect, there is provided a computer program product comprising instructions to cause the system of the first aspect to carry out the method of the second aspect.

It will be appreciated that the aforesaid present method is not merely a "method of detecting deception" as such, "software for a computer, as such", "methods of doing a mental act, as such", but has a technical effect in that the method detects deception in the Audio-Video response of the user, using the server, in the distributed computing architecture. The method of detecting deception involves building an artificially intelligent machine learning model and/or using the machine learning model to address, for example to solve, the technical problem of deception detection to enable security and expedite multiple workflows in a digital and distributed process.

Further, compensating the at least one element of the detection deception system optionally causes a hardware reconfiguration of the system, for example selectively switches in additional processor capacity and/or more data memory capacity and/or different types of graphic processor chip, and the hardware reconfiguration or hardware status is regarded as being technical in nature. Thus, to consider the method of the present disclosure to be subject matter that is excluded from patentability would be totally inconsistent with US practice in respect of inventions that are technically closely related to embodiments described in the present disclosure.

Embodiments of the present disclosure substantially eliminate or at least partially address the aforementioned existing technologies to efficiently detect the deception in the video and audio response of the user.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
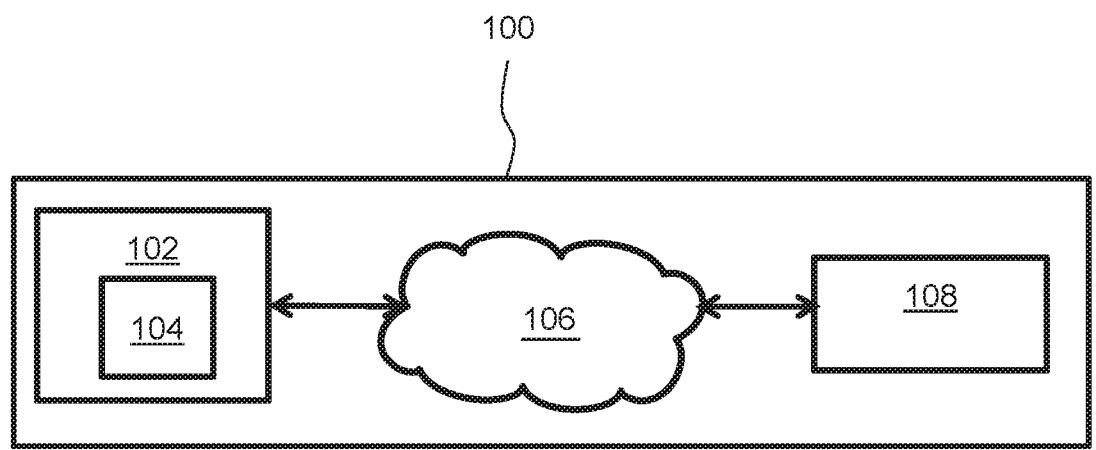
FIG. 1A is a schematic illustration of a system in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a method for (of) detecting deception in an Audio-Video response of a user, using a server, in a distributed computing architecture, characterized in that the method comprising:

enabling an Audio-Video connection with a user device upon receiving a request from a user;

obtaining, from the user device, an Audio-Video response of the user corresponding to a first set of questions that are provided to the user by the server;

extracting audio signals and video signals from the Audio-Video response;

detecting an activity of the user by
determining a plurality of Natural Language Processing (NLP) features from the extracted audio signals by (i) performing a speech to text translation and (ii) extracting the plurality of NLP features from the translated text; and
determining a plurality of speech features from the extracted audio signals by (i) splitting the extracted audio signals into a plurality of short interval audio signals and (ii) extracting the plurality of speech features from the plurality of short interval audio signals;

aggregating (i) the plurality of NLP features to obtain a plurality of temporal NLP features and (ii) the plurality of speech features to obtain a plurality of temporal speech features;

aggregating the plurality of temporal NLP features and the plurality of temporal speech features to obtain first temporal aggregated features;

detecting a plurality of micro-expressions of the user by
splitting extracted video signals into a plurality of short fixed-duration video signals;
detecting a plurality of Region of Interest (ROI) in the plurality of short fixed-duration video signals; and
comparing the plurality of detected ROI with video signals annotated with micro-expression labels that are stored in a database to detect the plurality of micro-expressions of the user in the plurality of short fixed-duration video signals;

tracking and determining a gesture of the user from the extracted video signals;

aggregating the plurality of micro-expressions and the gesture of the user to obtain second temporal aggregated features;

aggregating the first temporal aggregated features and the second temporal aggregated features to obtain final temporal aggregated features; and detecting, using a machine learning model, a deception in the Audio-Video response based on the final temporal aggregated features.

The present method improves and automates deception detection of the Audio-Video response of the user and expedites multiple workflows in a digital and distributed process in real-time. The present method scales the distributed computing architecture between the user device and the server in real-time based on load of the server and/or the user device. The present method employs multiple modalities such as a video, an audio, a biometric, micro-expressions, etc. for detecting deception in the Audio-Video response of the user. The present method improves a security for increasingly distributed and digital transformation-oriented users due to deception detection. The present method optionally detects deception while verifying identity, security and distributed nature of transactions, and documentation verification and/or security of the user. The present method optionally provides different levels of security for different modalities. The present method optionally provides different levels of security based on a use of the deception detection. The present method optionally detects deception with adaptive security change as the user changes locational context. The present method optionally enables the user to obtain a feedback from a reviewer as deceptive or truthful on the Audio-Video response. The present method optionally eliminates manual verification on identity, security and distributed nature of transactions, and documentation verification and/or security of the user. The present method optionally decides to transact/transfer data based on the deception detected on the Audio-Video response of the user. The present method optionally improves a reliability of digital and distributed transactions based on the detected deception on the audio-video response of the user. In an embodiment, the present method is implemented in a software or a hardware or a combination thereof.

In an embodiment, the server enables the Audio-Video connection with the user device associated with the user upon receiving a request from the user through a network. In an embodiment, the network is a wired network. In another embodiment, the network is a wireless network. In yet another embodiment, the network is a combination of the wired network and the wireless network. In yet another embodiment, the network is the Internet. In an embodiment, the user device comprises at least one of (i) a virtual bot or (ii) an assist bot. The server is optionally a tablet, a desktop, a personal computer or an electronic notebook. In an embodiment, the server is optionally a cloud service.

In an embodiment, the server provides a set of stimulus and response to the user device associated with the user. The set of stimulus and response provided by the server optionally be basic questions on identity of the user such as a name, an age, educational qualifications, a date of birth etc. In an embodiment, the set of stimulus and response may optionally include multi-modal queries. In an embodiment, the multi-modal queries may optionally include but not limited to a text based query, a visual based query and a workflow based query. In an embodiment, the visual based query includes but not limited to a photograph, a screen shot, a scanned image and a video frame. The server optionally generates the set of stimulus and response by (i) synthesizing a plurality of Natural Language Processing (NLP) questions by interrogating a knowledge repository of the user's data and (ii) synthesizing audio and video signals for the plurality of Natural Language Processing (NLP) questions using the virtual bot. The user device obtains the Audio-Video response of the user corresponding to the set of stimulus and response provided by the server and communicates the Audio-Video response to the server through the network. In an embodiment, the user device obtains the audio response of the user using a microphone associated with the user device. In another embodiment, the user device captures the video response of the user using a camera associated with the user device.

The server optionally detects an activity of the user using a Natural Language Processing model. In an embodiment, the plurality of Natural Language Processing features comprises a change in language syntax used by the user.

In an embodiment, the server employs a windowing method to split the extracted audio signals into a plurality of short interval audio signals. The windowing method is a process of taking a small subset of a larger dataset, for processing and analysis. A naive approach, the rectangular window, involves simply truncating the audio signals before and after the window into the plurality of short interval audio signals, while not modifying the contents of the window at all. In an embodiment, the server employs a machine learning extracting technique to extract the plurality of speech features from the plurality of short interval audio signals.

In an embodiment, the server contains a micro-expression classifier that is trained with real life videos marked with micro-expressions of the plurality of the users.

In an embodiment, the gesture comprises movement of hands, face, or other parts of body of the user. In an embodiment, the server detects deception based on a biometric of the user. In an embodiment, the biometric includes, but are not limited to a fingerprint, palm veins, face recognition, DNA, palm print, hand geometry, iris recognition, retina of the user.

The method optionally generates, for example, for ease of processing, a table of (i) real-time datasets that comprises deceptive and truthful responses of one or more users, and (ii) the audio-video response from the user for the first set of questions or a feedback from a reviewer on the audio-video response of the user for the first set of questions for training the multi modal algorithm. In an example embodiment, the method uses at least one of regression model, artificial intelligence (AI), Machine Learning or a neural network algorithm for generating the multi modal algorithm. Such regression model, artificial intelligence (AI), Machine Learning or a neural network algorithm will be understood by a person skilled in the art of computer system design. It will be appreciated in embodiments of the present disclosure that the multi modal algorithm of the method is trained on (i) the real-time datasets that comprises deceptive and truthful responses of one or more users, and (ii) the audio-video response from the one or more users for the first set of questions or a feedback from the reviewer on the audio-video response of the one or more users for the first set of questions, to define various parameters of the algorithm, and then, thereafter, the multi modal algorithm ascertains deceptive or truthful of the Audio-Video response of the user.

In an embodiment, the server obtains a plurality of video responses from multiple users for the first set of questions and creates a session by combining the plurality of video responses, in which the plurality of reviewers provides his/her feedback on the plurality of video responses as deceptive or truthful. In an embodiment, the multi modal algorithm is trained by providing the plurality of video responses that are obtained from the multiple users for the first set of questions as the real-time datasets to detect deception efficiently. Further, the server provides a framework by intermixing or combining the plurality of video responses from the multiple users to provide intricate and engaging experience for the one or more users or reviewers. In an embodiment, the sever obtains more video responses from the multiple users for training the multi modal algorithm.

According to an embodiment, the method further comprises preprocessing the audio and the video signals that are obtained from the user device to cancel noise from the audio and the video signals. In an embodiment, the server preprocesses the video signals to cancel shakes in the video signals captured by the user device associated with the user.

According to another embodiment, the method further comprises providing the Audio-Video response of the user to a plurality of reviewers to provide feedback on the Audio-Video response as deceptive or truthful.

According to yet another embodiment, the Audio-Video response further comprises metadata including a time at which the user provides the Audio-Video response and data on the first set of questions that are provided to the user.

According to yet another embodiment, the method further comprises
providing a second set of questions to the user using a knowledge repository; and
detecting, using the machine learning model, deception in Audio-Video response of the user corresponding to the second set of questions.

In an embodiment, the second set of questions comprises at least one of follow up or actual past history questions. In an embodiment, the method performs deception detection at each stage of workflow of the distributed process.

According to yet another embodiment, the machine learning model comprises a multi-modal algorithm, wherein the machine learning model is trained using (i) real-time datasets that comprises deceptive and truthful responses of one or more users, and (ii) the audio-video response from the user for the first set of questions or a feedback from a reviewer on the audio-video response of the user for the first set of questions, wherein the machine learning model is configured to receive the Audio-Video response of the user and to output as deceptive or truthful Audio-Video response.

According to yet another embodiment, the method further comprises repeating the first set of questions to the user to reinforce the deception detection by (i) compensating latency and real-time inference accuracy and (ii) turning on or off one or more modalities that modulate between more modalities and less modalities with higher fidelity of accuracy if the detected deception of the Audio-Video response corresponding to the first set of questions is not satisfied.

According to yet another embodiment, the method comprises scaling up or down the computation of each modality with respect to the user device and the server, wherein the scalability of each modality is determined based on the final temporal aggregated features extracted from the Audio-Video response. In an embodiment, the scalability of each modality comprises a quality of the audio signals and video signals such as audio bitrate, video bitrate, etc.

According to yet another embodiment, the user device comprises at least one of (i) a virtual bot or (ii) an assist bot.

According to yet another embodiment, the plurality of Natural Language Processing features comprises at least one of (i) a number of words per second or (ii) a change in syntax of text.

According to yet another embodiment, the plurality of speech features comprises at least one of (i) a speech tone or (ii) a frequency change and a pause rate change of speech.

According to yet another embodiment, the plurality of micro-expressions is determined by analyzing at least one of left side eyebrows, right side eyebrows, a left upper eyelid, a left lower eyelid, a right upper eyelid, a right lower eyelid or cheek muscles of the user in the plurality of short fixed-duration video signals.

According to yet another embodiment, the method further comprises storing the detected deception associated with the Audio-Video response of the user as reference data in the knowledge repository to ascertain deceptiveness of the user in future.

In an embodiment, the server stores user's identification document and a GPS location of the user in the knowledge repository. In an embodiment, the knowledge repository contains a plurality of data associated with a plurality of users obtained from a third-party database. In an embodiment, the server synthesis 1 to n set of questions based on data associated with the user available from the knowledge repository.

In an embodiment, the server comprises an analysis engine to detect deception of the Audio-Video response of the user.

In an embodiment, the server comprises an audit repository that stores 1 to n set of questions, Audio-Video responses of corresponding 1 to n set of questions and output of the analysis engine. In an embodiment, the audit repository that comprises 1 to n set of questions, Audio-Video responses of corresponding 1 to n set of questions and the output of the analysis engine are used for training of the machine learning model to detect deception in the audio-video response of the user.

In an exemplary embodiment, a method for (of) detecting deception in Video responses received from a plurality of users (i.e. multiple users), using a server, in a distributed computing architecture, characterized in that the method comprising:
enabling Video connection with a plurality of user devices upon receiving a request from the plurality of users;
obtaining, from the plurality of user devices, the video responses of the plurality of users corresponding to a first set of questions that are provided to the plurality of users by the server;
combining the video responses of the plurality of users to generate a composite video response;
extracting audio signals and video signals from the composite video response;
  detecting an activity of the plurality of users by
  determining a plurality of Natural Language Processing (NLP) features from the extracted audio signals by (i) performing a speech to text translation and (ii) extracting the plurality of NLP features from the translated text; and
  determining a plurality of speech features from the extracted audio signals by (i) splitting the extracted audio signals into a plurality of short interval audio signals and (ii) extracting the plurality of speech features from the plurality of short interval audio signals;
  aggregating (i) the plurality of NLP features to obtain a plurality of temporal NLP features and (ii) the plurality of speech features to obtain a plurality of temporal speech features;
  aggregating the plurality of temporal NLP features and the plurality of temporal speech features to obtain first temporal aggregated features;
  detecting a plurality of micro-expressions of the plurality of users by splitting extracted video signals into a plurality of short fixed-duration video signals;
    detecting a plurality of Region of Interest (ROI) in the plurality of short fixed-duration video signals; and
    comparing the plurality of detected ROI with video signals annotated with micro-expression labels that are stored in a database to detect the plurality of micro-expressions of the plurality of users in the plurality of short fixed-duration video signals;

tracking and determining a gesture of the plurality of users from the extracted video signals;

aggregating the plurality of micro-expressions and the gesture of the plurality of users to obtain second temporal aggregated features;

aggregating the first temporal aggregated features and the second temporal aggregated features to obtain final temporal aggregated features; and detecting, using a machine learning model, a deception in the composite video response based on the final temporal aggregated features.

In an embodiment, the composite video response is provided to a plurality of reviewers to obtain a feedback on the composite video response as deceptive or truthful. In an embodiment, the plurality of video responses that are obtained from the plurality of users for the first set of questions is provided as training data to the multi modal algorithm to detect deception efficiently.

In an exemplary embodiment, for creating an account with a bank, a user initiates an interview process by providing a request to a banking server that comprises a machine learning model to detect deception of the user. A virtual agent or bot (e.g. the user device) enables an Audio-Video connection between the user and the banking server. The server provides a first set of questions related to identity to the user on the virtual agent or bot. The banking server obtains an Audio-Video response of the user from the virtual agent or bot and detects deception of the Audio-Video response of the user, using the machine learning model, by analyzing multiple modalities (e.g. a video, an audio, a biometric, micro-expressions etc.) on the Audio-Video response. Further, the banking server provides a second set of questions based on deception detection on the first set of questions. The banking server computes scaling up or down of multiple modalities based on the trust or on deception detection on the first set of questions. The banking server provides n set of questions to the user until it gets trustworthiness of the user and creates the bank account in the name of the user upon verifying identity and documents.

In an another exemplary embodiment, the method implements a mobile application with multiple set of questions that (i) allow a first user to answer a first set of questions from the multiple set of questions (ii) records an Audio-Video response of the first user to the first set of questions with a timestamp (iii) allow the first user to share the Audio-Video response of the first set of questions to multiple users of the mobile application for detecting deception in the Audio-Video response or allow the first user to guess deceptive or truthful of Audio-Video response of a second user corresponding to one set of questions from the multiple set of questions and (iv) provide reward or score to the first user based on the feedback from the multiple users of the mobile application or provide reward or score to the second user based on feedback by the first user on the Audio-Video response of the second user. In an embodiment, the method allows to log in to the mobile application with one of the Single sign-on options. Single sign-on (SSO) is a session and user authentication service that permits the user to use one set of login credentials (e.g. a name and a password) to access multiple applications. SSO optionally be used by enterprises, smaller organizations, and individuals to mitigate the management of various usernames and passwords.

According to a second aspect, there is provided a system for (of)

detecting deception in an Audio-Video response of a user, in a distributed computing architecture, characterized in that the system comprising:

a server that comprises a processor that executes a machine learning algorithm, wherein at least one storage medium is coupled to the server and contains a knowledge repository of the user data;

at least one input interface that receives a request from a user device associated with a user and provides the request to the server to enable an Audio-Video connection between the user device and the server; and at least one output interface that provides detected deception associated with the Audio-Video response of the user;

wherein the server provides a first set of question to the user through a user interface of the user device by interrogating the knowledge repository and receives an Audio-Video response of the user corresponding to the first set of questions through the at least one input interface to extract audio signals and video signals from the Audio-Video response;

detect an activity of the user by:
 determining a plurality of Natural Language Processing (NLP) features from the extracted audio signals by (i) performing a speech to text translation and (ii) extracting the plurality of NLP features from the translated text; and determining a plurality of speech features from the extracted audio signals by (i) splitting the extracted audio signals into a plurality of short interval audio signals and (ii) extracting the plurality of speech features from the plurality of short interval audio signals;

aggregate (i) the plurality of NLP features to obtain a plurality of temporal NLP features and (ii) the plurality of speech features to obtain a plurality of temporal speech features;

aggregate the plurality of temporal NLP features and the plurality of temporal speech features to obtain first temporal aggregated features;

detect a plurality of micro-expressions of the user by:

splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

track and determine a gesture of the user from the extracted video signals;

aggregate the plurality of micro-expressions and the gesture of the user to obtain second temporal aggregated features;

aggregate the first temporal aggregated features and the second temporal aggregated features to obtain final temporal aggregated features; and detect, using a machine learning model, a deception in the Audio-Video response based on the final temporal aggregated features by interrogating the knowledge repository.

The present disclosure provides a computer program product comprising instructions to cause the above system to carry out the above method.

The advantages of the present system and/or computer program product are thus identical to those disclosed above in connection with the present method and the embodiments listed above in connection with the method apply mutatis mutandis to the system and/or computer program product.

Embodiments of the present disclosure optionally detect deception while verifying identity, security and distributed nature of transactions, and documentation verification and/or security of the user. Embodiments of the present disclosure optionally scale the distributed computing architecture between the user device and the server in real-time based on load of the server and/or the user device. Embodiments of the present disclosure optionally employ multiple modalities such as a video, an audio, a biometric, micro-expressions, etc. for detecting deception in the Audio-Video response of the user. Embodiments of the present disclosure optionally enable the user to obtain a feedback from a reviewer as deceptive or truthful on the Audio-Video response. Embodiments of the present disclosure optionally eliminate manual verification on identity, security and distributed nature of transactions, and documentation verification and/or security of the user. Embodiments of the present disclosure optionally decide to transact/transfer data based on the deception detected on the Audio-Video response of the user. Embodiments of the present disclosure optionally perform deception detection in real-time and in automatic manner. Embodiments of the present disclosure optionally expedite a workflow of a distributed process due to automatic detection of deception on the Audio-Video response of the user. Embodiments of the present disclosure optionally improve a reliability of digital and distributed transactions based on the detected deception of the user. Embodiments of the present disclosure optionally improve a security across workflow of the distributed process due to deception detection. Embodiments of the present disclosure optionally provide different levels of security for different modalities. Embodiments of the present disclosure optionally provide different levels of security based on a use of the deception detection. Embodiments of the present disclosure optionally provide detects deception with adaptive security change as the user changes locational context.

DETAILED DESCRIPTION OF THE DRAWINGS

FIG. 1A is a schematic illustration of a system 100 in accordance with an embodiment of the present disclosure. The system 100 comprises a server 102 that comprises a processor 104 that is connected, when in operation, via a network 106 to a user device 108. The functions of these parts are as has been described above. In an embodiment, the system 100 comprises an input interface that is connected with the server 102 for receiving a request from the user device 108. In an embodiment, the system 100 comprises an output interface for providing deception detection result.

Figure 1B:
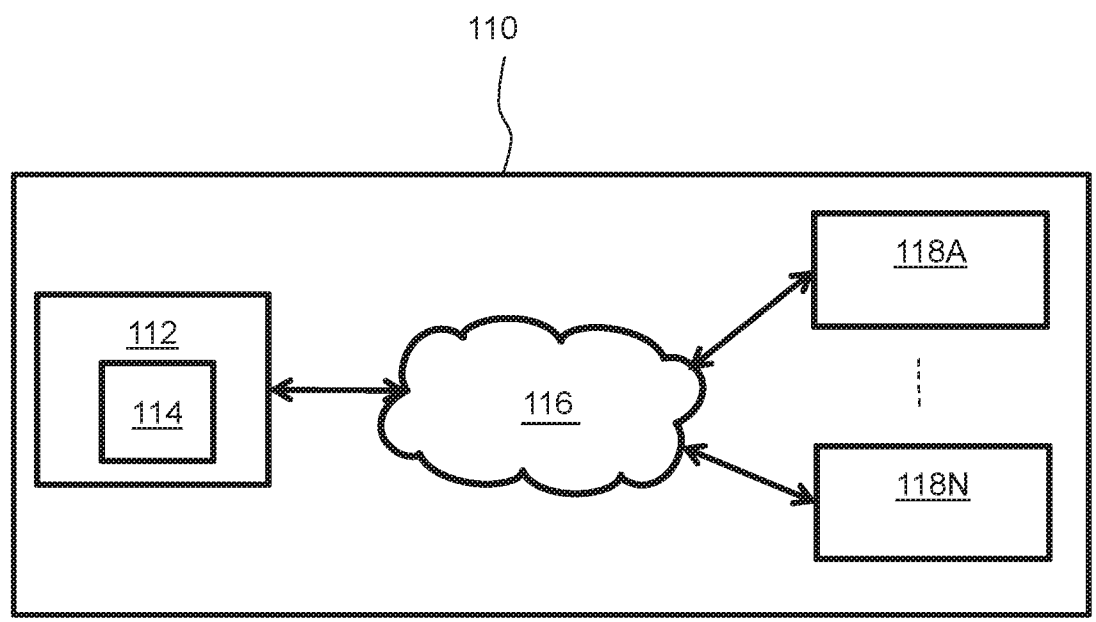
FIG. 1B is a schematic illustration of a system that includes one or more user devices in accordance with an embodiment of the present disclosure.

FIG. 1B is a schematic illustration of a system 110 that includes one or more user devices 118A-N in accordance with an embodiment of the present disclosure. The system 110 comprises a server 112 that comprises a processor 114 that is connected, when in operation, via a network 116 to the one or more user devices 118A-N. The functions of these parts are as has been described above. In an embodiment, the system 110 comprises an input interface that is connected with the server 112 for receiving requests from the one or more user devices 118A-N associated with one or more users. The server 118 provides a first set of questions to the one or more users and obtains a plurality of video responses from the one or more user devices 118A-N associated with the one or more users. In an embodiment, the system 110 comprises an output interface for providing deception detection result.

Figure 2:
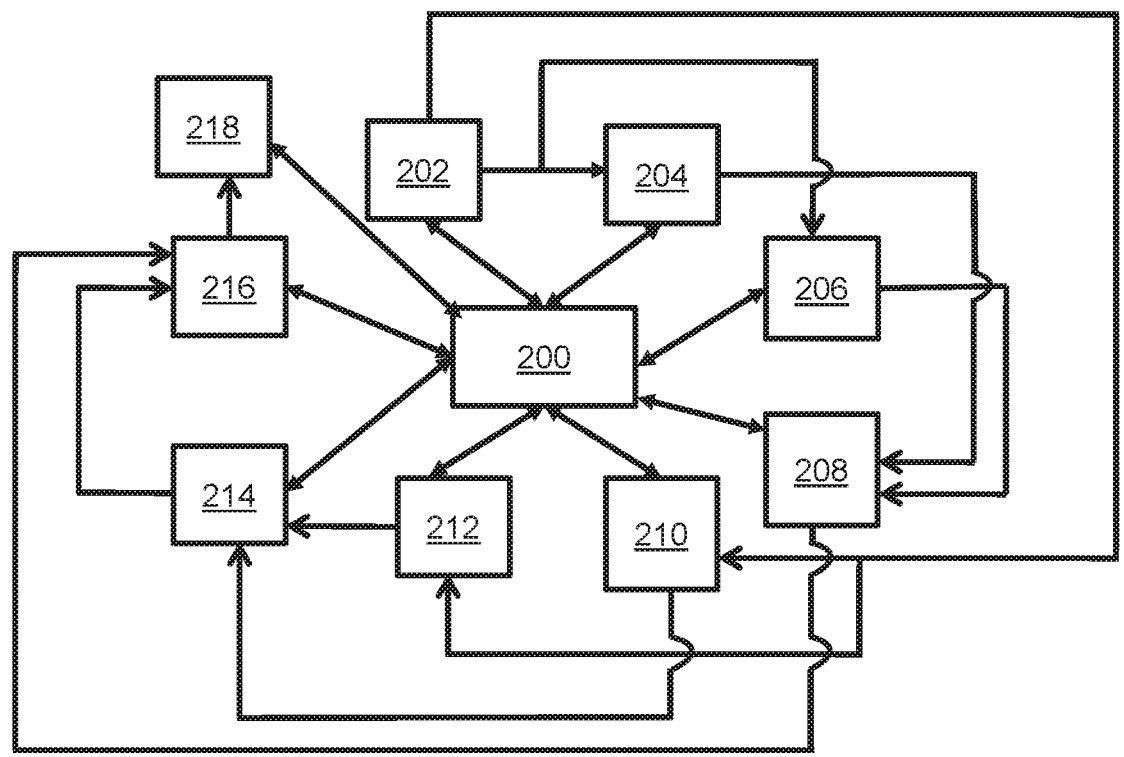
FIG. 2 is a functional block diagram of a server in accordance with an embodiment of the present disclosure.

FIG. 2 is a functional block diagram of a server in accordance with an embodiment of the present disclosure. The functional block diagram of the server comprises a database 200 comprising a knowledge repository, an audio and video signals extracting module 202, a Natural Language Processing (NLP) features determining module 204, a speech features determining module 206, a first temporal aggregated features generating module 208, a micro-expression detecting module 210, a gesture detection module 212, a second temporal aggregated features generating module 214, a final temporal aggregated features generating module 216, and a deception detection module 218. The audio and video signals extracting module 202 extracts audio signals and video signals from an Audio-Video response of a user corresponding to a first set of questions that are provided to the user by the server. In an embodiment, the Audio-Video response of the user is received from a user device. The Natural Language Processing (NLP) features determining module 204 determines a plurality of Natural Language Processing (NLP) features from the extracted audio signals by (i) performing a speech to text translation and (ii) extracting the plurality of NLP features from the translated text. The speech features determining module 206 determines a plurality of speech features from the extracted audio signals by (i) splitting the extracted audio signals into a plurality of short interval audio signals and (ii) extracting the plurality of speech features from the plurality of short interval audio signals. The first temporal aggregated features generating module 208 aggregates (i) the plurality of NLP features to obtain a plurality of temporal NLP features and (ii) the plurality of speech features to obtain a plurality of temporal speech features. The first temporal aggregated features generating module 208 aggregates the plurality of temporal NLP features and the plurality of temporal speech features to obtain first temporal aggregated features. The micro-expression detecting module 210 detects a plurality of micro-expressions of the user by splitting extracted video signals into a plurality of short fixed-duration video signals, detecting a plurality of Region Of Interest (ROI) in the plurality of short fixed-duration video signals, comparing the plurality of detected ROI with video signals annotated with micro-expression labels that are stored in a database to detect the plurality of micro-expressions of the user in the plurality of short fixed-duration video signals. The gesture detection module 212 tracks and determines a gesture of the user from the extracted video signals. The second temporal aggregated features generating module 214 aggregates the plurality of micro-expressions and the gesture of the user to obtain second temporal aggregated features. The final temporal aggregated features generating module 216 aggregates the first temporal aggregated features and the second temporal aggregated features to obtain final temporal aggregated features. The deception detection module 218 detects, using a machine learning model, a deception in the Audio-Video response based on the final temporal aggregated features.

Figure 3:
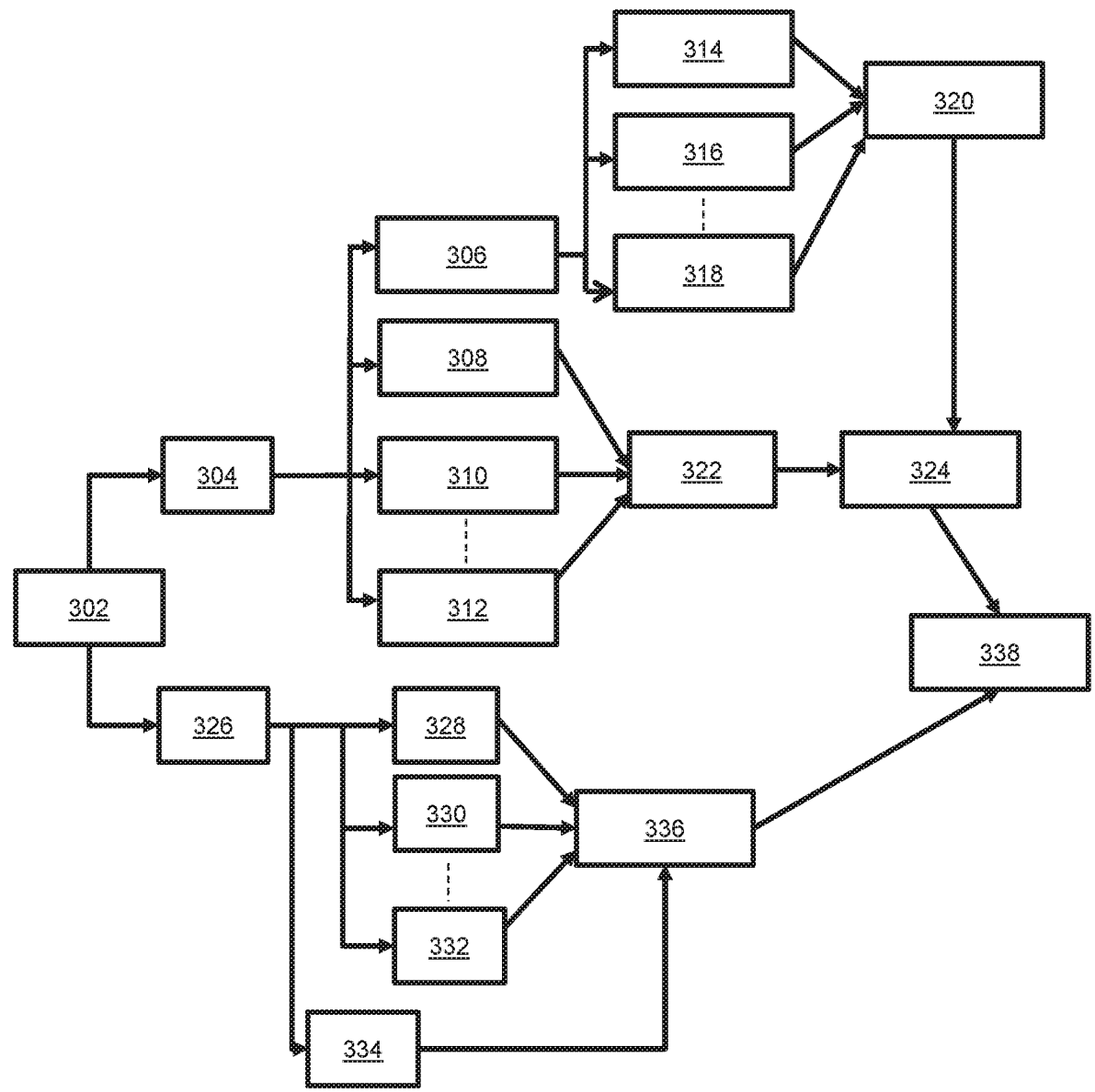
FIG. 3 is a flowchart illustrating steps of a method for (of) determining final temporal aggregated features from an Audio-Video response of a user for detecting deception in accordance with an embodiment of the present disclosure.

FIG. 3 is a flowchart illustrating steps of a method for (of) determining final temporal aggregated features from an Audio-Video response of a user for detecting deception in accordance with an embodiment of the present disclosure. At a step 302, audio signals and video signals are extracted from the Audio-Video response of the user. At a step 304, the audio response that are obtained from a user device is preprocessed to cancel noise from the audio response. At a step 306, a speech to text translation is performed to obtain text that corresponds to speech of the user. At a step 308, a first speech feature comprising at least one of (i) a speech tone or (ii) a frequency change is computed from the extracted audio signals. At a step 310, a second speech feature comprising a pause rate change of speech is computed from the extracted audio signals. At a step 312, a nth speech feature is computed from the extracted audio signals. In an embodiment, the plurality of speech features is computed by (i) splitting the extracted audio signals into a plurality of short interval audio signals and (ii) extracting the plurality of speech features from the plurality of short interval audio signals. At a step 314, a first Natural Language Processing (NLP) feature that comprises a speech word count per second corresponds to the translated text is determined. At a step 316, a second Natural Language Processing (NLP) feature that comprises a change in syntax corresponds to the translated text is determined. At a step 318, nth Natural Language Processing (NLP) feature that corresponds to the translated text is determined. At a step 320, the first Natural Language Processing (NLP) feature, the second Natural Language Processing (NLP) and the nth Natural Language Processing (NLP) feature are aggregated to obtain a plurality of temporal NLP features. At a step 322, the first speech feature, the second speech feature and the nth speech feature are aggregated to obtain a plurality of temporal speech features. At a step 324, the plurality of temporal NLP features and the plurality of temporal speech features are aggregated to obtain first temporal aggregated features. At a step 326, the video response that are obtained from the user device are preprocessed to cancel noise and shakes. At a step 328, a first micro-expression in at least one of a left eye-brow or a right eye brow of the user is determined. At a step 330, a second micro-expression in at least one of eyelids such as left upper, left lower, right upper or right lower of the user is determined. At a step 332, a nth micro-expression in cheek muscles of the user is determined. At a step 334, a gesture of the user is tracked and determined from the extracted video signals. At a step 336, a plurality of micro-expressions (i.e. the first micro-expression, the second micro-expression, the nth micro-expression) and the gesture of the user are aggregated to obtain second temporal aggregated features. At a step 338, the first temporal aggregated features and the second temporal aggregated features are aggregated to obtain final temporal aggregated features for detecting deception based on the final temporal aggregated features.

Figure 4:
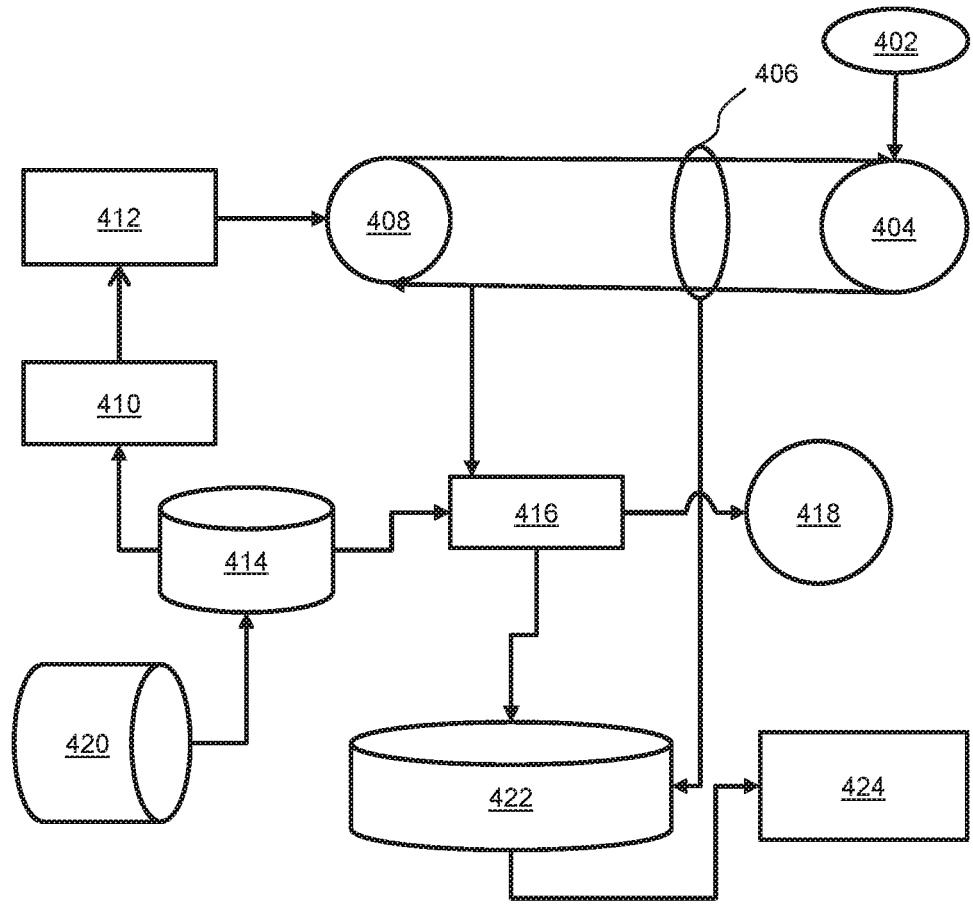
FIG. 4 is a flowchart illustrating a process flow for (of) detecting deception in an Audio-Video response of a user using a system in accordance with an embodiment of the present disclosure.

FIG. 4 is a flowchart illustrating a process flow for (of) detecting deception in an Audio-Video response of a user using a system in accordance with an embodiment of the present disclosure. At a step 402, the method of detecting deception process is started. At a step 404, a user is enabled to call or make a request to enable an Audio-Video connection between a user device associated with the user and a server. At a step 406, an audio video (AV) multi-modal session between the user device and the server is started. At a step 408, a first set of questions is provided by the server to the user on a virtual bot (i.e. the user device) through the audio video (AV) multi-modal session. In an embodiment, answers are obtained from the user using the virtual bot. At a step 410, a plurality of Natural Language Processing (NLP) questions (e.g. a first set of questions) are generated by interrogating the user's data stored in a knowledge repository. At a step 412, audio and video response of the user for the plurality of Natural Language Processing (NLP) questions are captured using the virtual bot. At a step 414, detected deception associated with an Audio-Video response of the user is stored as reference data in the knowledge repository to ascertain deceptiveness of the user in future. At a step 416, the Audio-video response of the user is analyzed with the reference data in the knowledge repository using an analytics engine. At a step 418, deceptive or truthful decision is generated based on a response from the analytics engine. At a step 420, third party data is provided to the knowledge repository. At a step 422, (i) the plurality of Natural Language Processing (NLP) questions, (ii) the audio-video response from the user for the plurality of NPL questions or a feedback from a reviewer on the audio-video response of the user for the plurality of NPL questions and (iii) the response from the analytics engine are stored in an audit repository. At a step 424, a machine learning model comprising a multi-modal algorithm is trained using (i) real-time datasets that comprises deceptive and truthful responses of one or more users, and (ii) the audio-video response from the user for the plurality of NPL questions or the feedback from the reviewer on the audio-video response of the user for the plurality of NPL questions.

In an embodiment, the server obtains a plurality of video responses from multiple users for the first set of questions and creates a session by combining the plurality of video responses, in which the plurality of reviewers provides his feedback on the plurality of video responses as deceptive or truthful. In an embodiment, the multi modal algorithm is trained by providing the plurality of video responses that are obtained from the multiple users for the first set of question as the real-time datasets to detect deception efficiently. Further, the server provides a framework by intermixing or combining the plurality of videos from the multiple users to provide intricate and engaging experience for the plurality of users or reviewers. In an embodiment, the sever receives more video responses from the multiple users for the first set of questions and providing those video responses as training data for training the multi modal algorithm.

Figure 5:
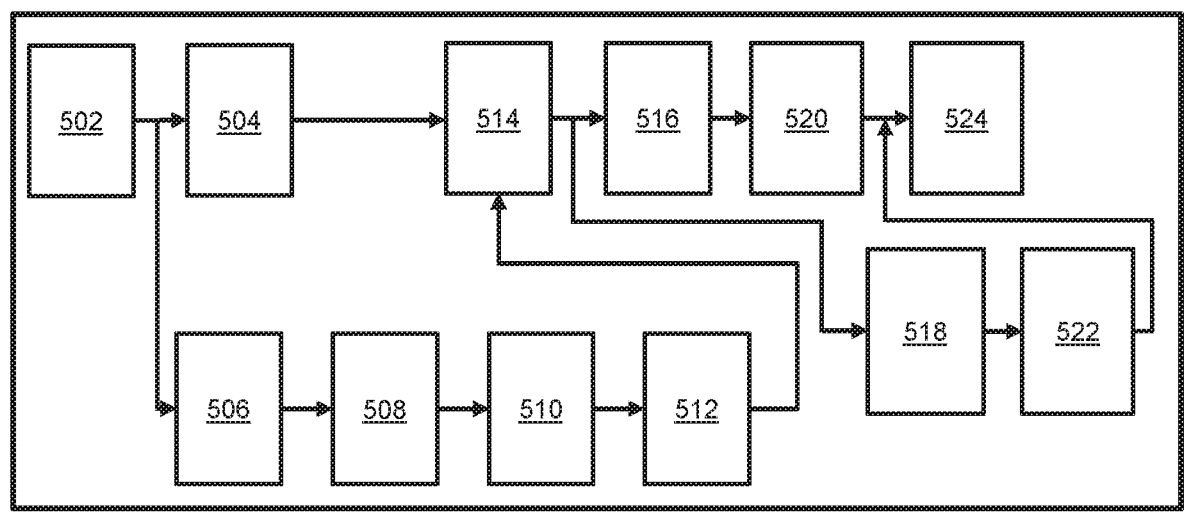
FIG. 5 is an exemplary view of a process flow of enabling a first user to record an audio-video response or providing a feedback on an Audio-Video response of other user as deceptive or truthful using a system in accordance with an embodiment of the present disclosure.

FIG. 5 is an exemplary view of a process flow of enabling a first user to record an audio-video response or providing a feedback on an Audio-Video response of other user as deceptive or truthful using a system in accordance with an embodiment of the present disclosure. At a step 502, a deception detection application is installed in a user device associated with a first user. At a step 504, the first user is logged in or signed in to the system using a user name and a password of the first user if the first user has an account for the system. At a step 506, the account of the first user is created by the system based on information provided by the first user. In an embodiment, the information comprises at least one of a name, an age, an email, a date of birth, etc. of the first user. In an embodiment, the system enables the first user to create the account using other accounts such as Google® or Facebook®. At a step 508, terms and conditions and disclosures are displayed to the first user. At a step 510, a notification that comprises "getting started" is displayed to the first user. At a step 512, the first user is enabled to select at least one of (i) a virtual bot or (ii) an assist bot. At a step 514, the first user is enabled to select at least one of a record option or a guess option at a gameplay landing page of the deception detection application if the first user has the account or if the first user created the account with the system. At a step 516, the first user is enabled to record a video and/or an audio response to a first set of questions if the user selects the record option. At a step 518, the first user is enabled to guess an Audio-Video response uploaded by a second user as deceptive or truthful using the system if the user selects the guess option. At a step 520, the first user is enabled to confirm the recordings of the video-audio response to the first set of questions. At a step 522, the first user is enabled to confirm guessing of the Audio-Video response uploaded by the second user as deceptive or truthful. At a step 524, the gameplay landing page is displayed to the first user if the first user completed at least one of the recordings or the guessing.

Figure 6:
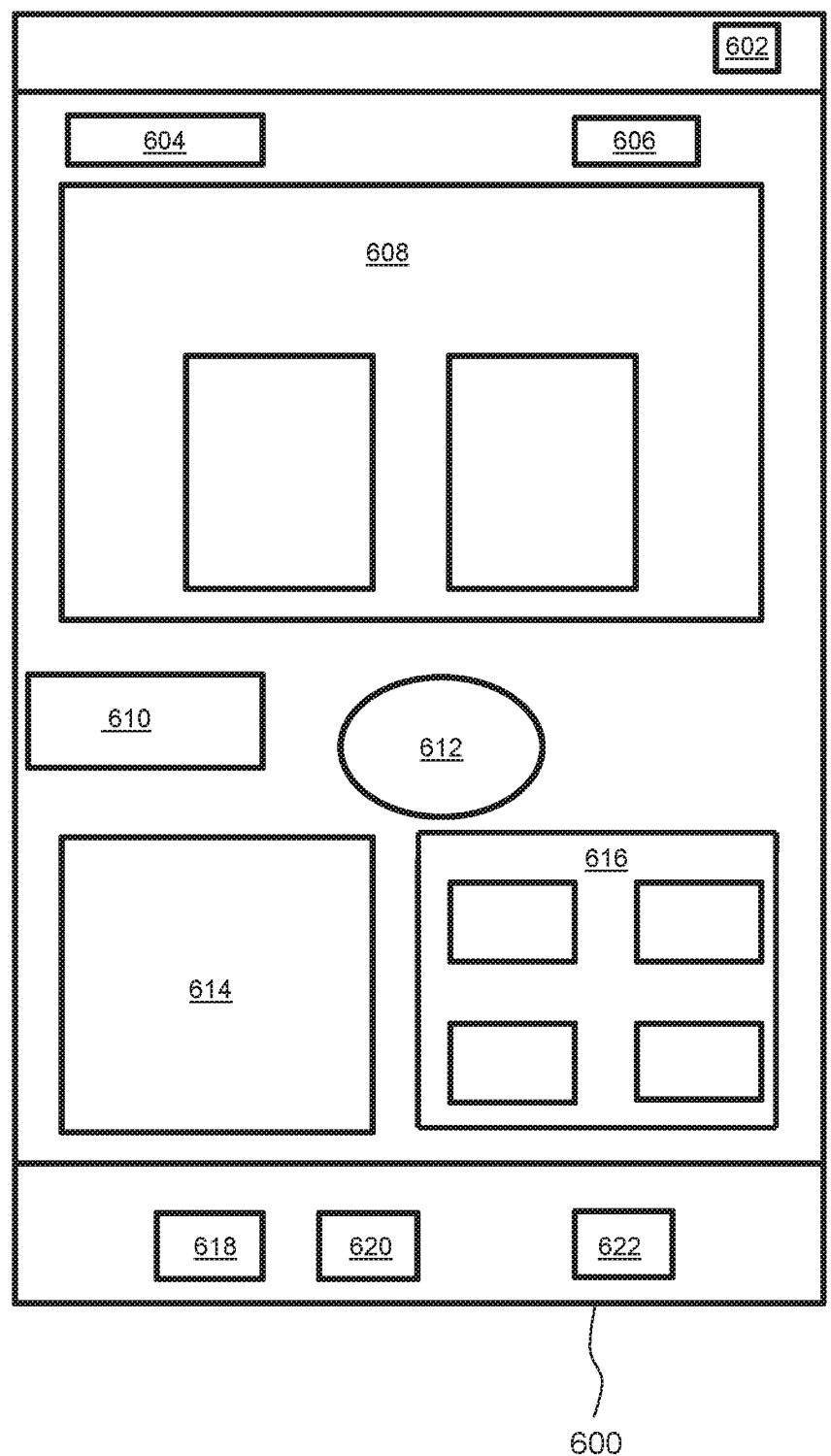
FIG. 6 is an exemplary view of a graphical user interface that depicts a game landing page of a system in accordance with an embodiment of the present disclosure.
Figure 7A:
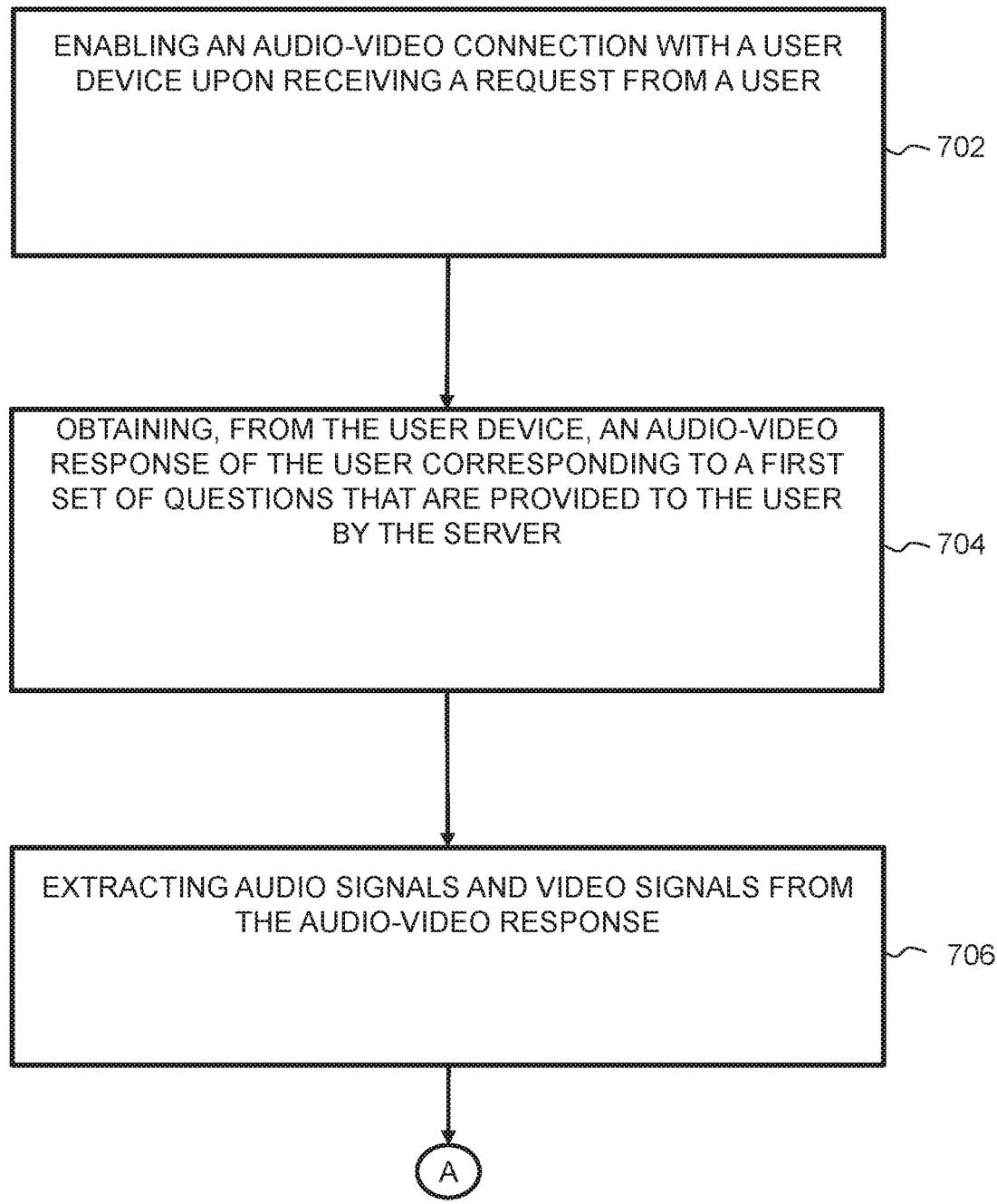
FIGS. 7A-7E are flowcharts illustrating steps of a method for (of) detecting deception in an Audio-Video response of a user, using a server, in a distributed computing architecture in accordance with an embodiment of the present disclosure.
Figure 7B:
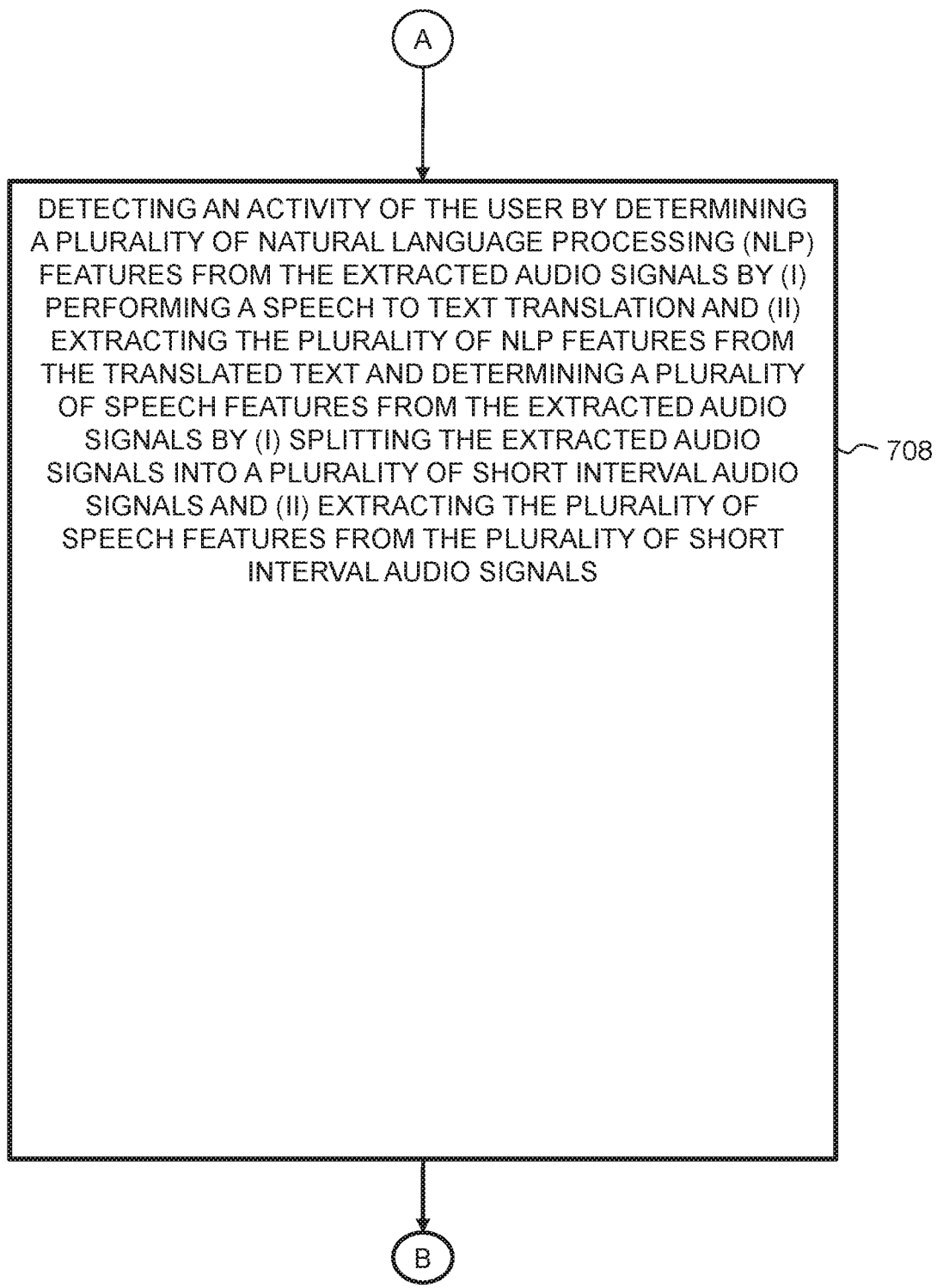
Figure 7C:
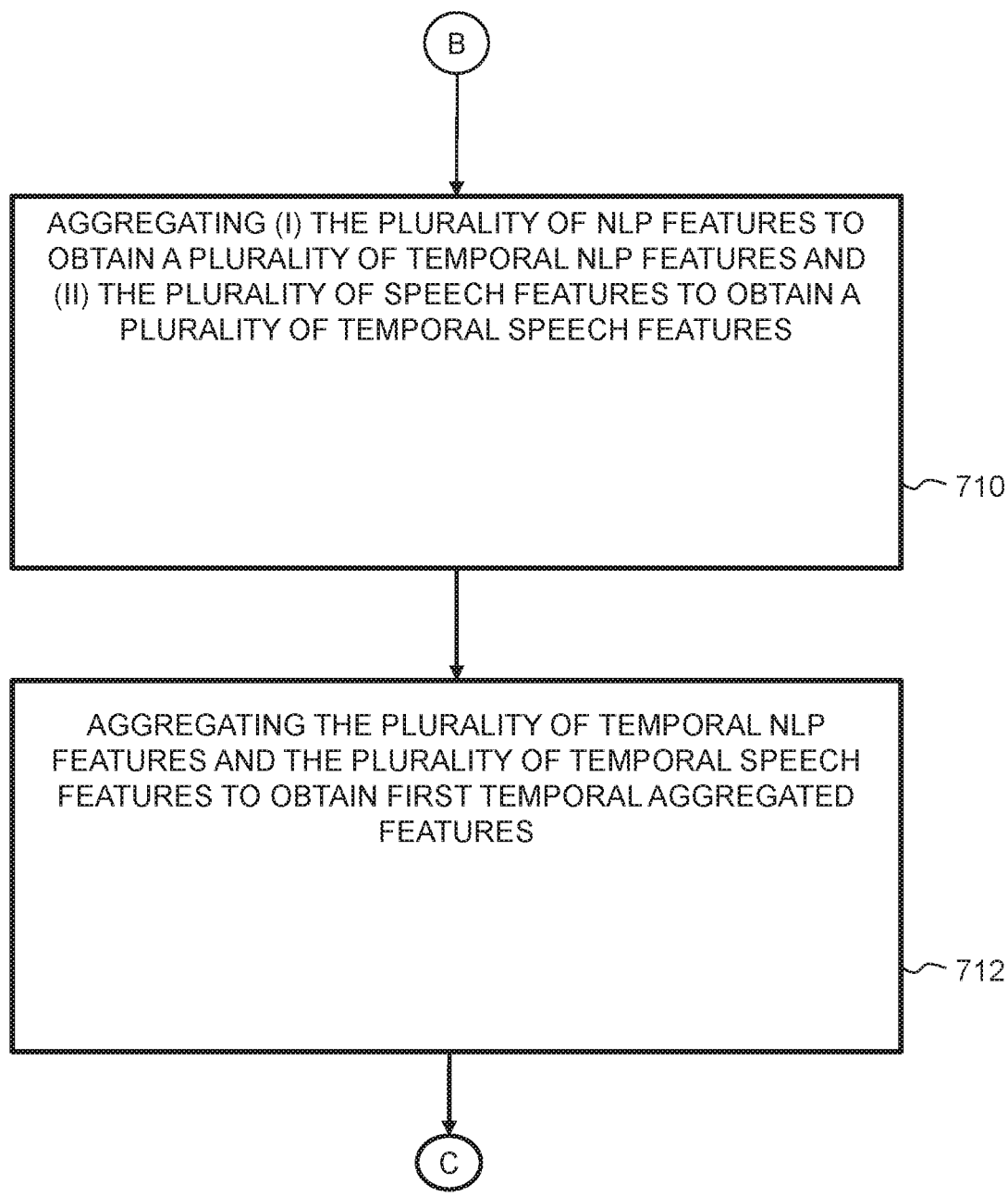
Figure 7D:
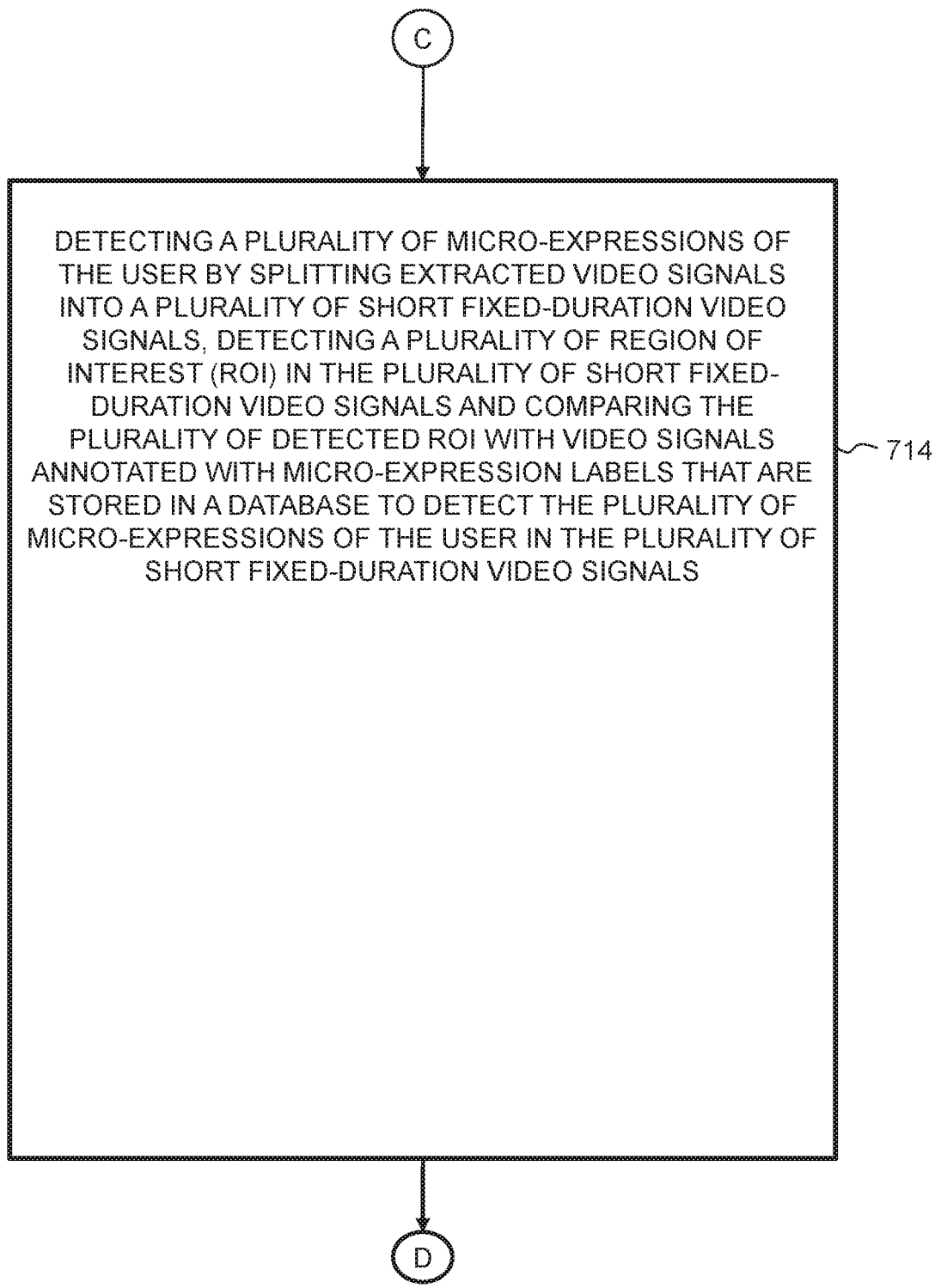
Figure 7E:
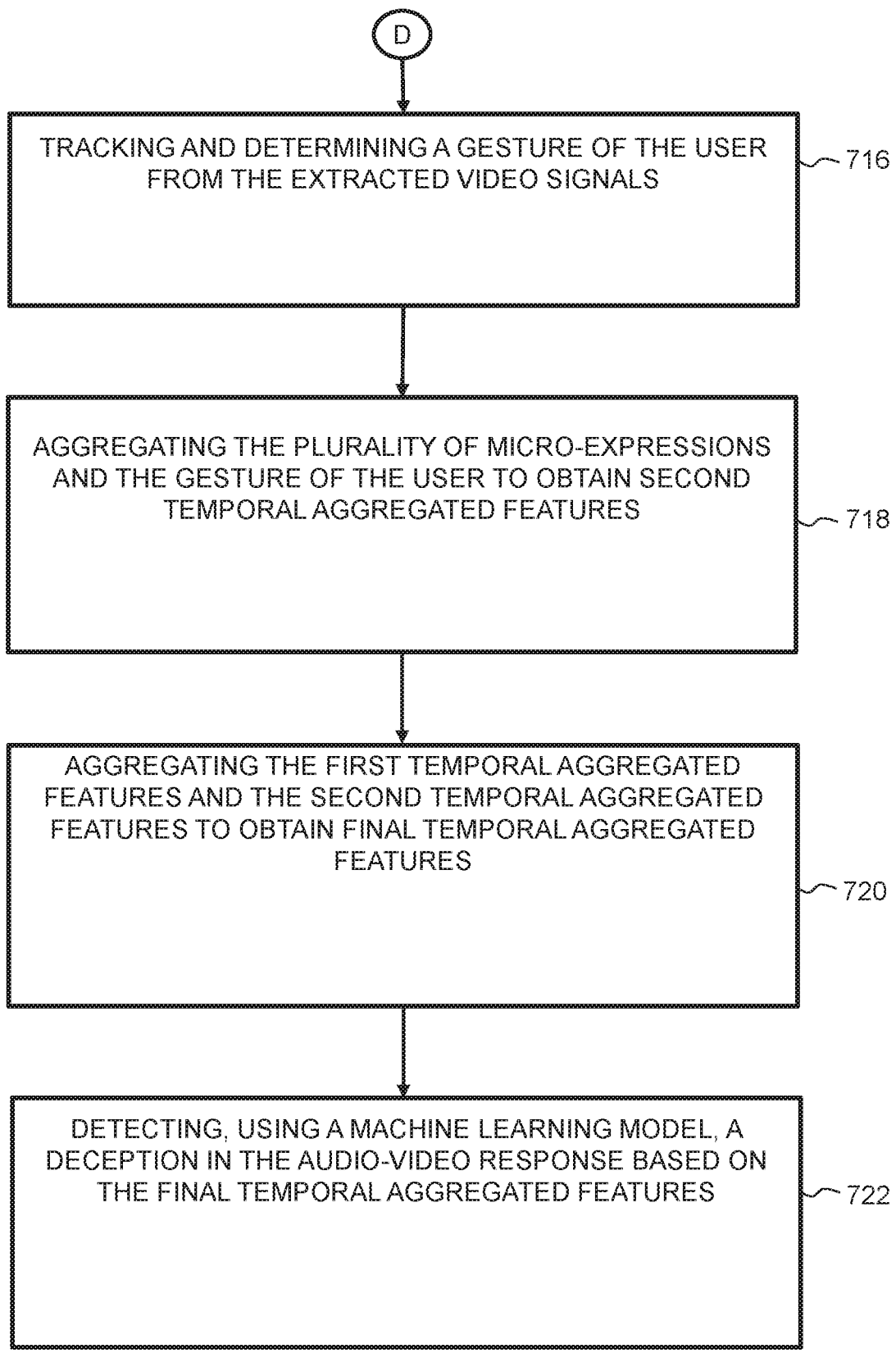

FIG. 6 is an exemplary view of a graphical user interface 600 that depicts a game landing page of a system in accordance with an embodiment of the present disclosure. The graphical user interface 600 depicts the game landing page of the system that comprises a settings menu 602, a level field 604 that indicates a level in a game associated with the deception detection, an attempt counter 606 that indicates a number of attempt that a user is attempted for recording an audio-video response to a first set of questions, a game window 608, an instruction text field 610 that provides instruction to the user for recording the audio-video response to the first set of questions, a record control with countdown and auto-stop option 612 that auto-starts or stops the audio-video response of the user, a live video playback window 614 that enables the user to playback the recorded audio-video response, a recording option 616, a profile menu 618, a recordings menu 620, and a current earnings field 622 that indicates points earned by the user for the recorded audio-video response based on a feedback received from other users on the audio-video response. The settings menu 602 comprises adjust bandwidth, geo location options, privacy and about and contact information. The game window 608 comprises a prompt text for positive truth, negative truth and lie. The recording option 616 enables the user to edit or re-record audio-video response. The profile menu 618 enables the user to (i) modify at least one of (a) a virtual bot or (b) an assist bot, (ii) provide at least one of a name, an email or other information of the user and (iii) delete a profile of the user. The recordings menu 620 enables the user to share or delete the recorded audio-video response.

FIGS. 7A-7E are flowcharts illustrating steps of a method for (of) detecting deception in an Audio-Video response of a user, using a server, in a distributed computing architecture in accordance with an embodiment of the present disclosure. At a step 702 of the method of detecting, an Audio-Video connection is enabled with a user device upon receiving a request from a user. At a step 704 of the method of detecting, an Audio-Video response of the user corresponding to a first set of questions that are provided to the user is obtained from the user device by the server. At a step 706 of the method of detecting, audio signals and video signals are extracted from the Audio-Video response. At a step 708 of the method of detecting, an activity of the user is detected by determining a plurality of Natural Language Processing (NLP) features from the extracted audio signals by (i) performing a speech to text translation and (ii) extracting the plurality of NLP features from the translated text; and determining a plurality of speech features from the extracted audio signals by (i) splitting the extracted audio signals into a plurality of short interval audio signals and (ii) extracting the plurality of speech features from the plurality of short interval audio signals. At a step 710 of the method of detecting, (i) the plurality of NLP features is aggregated to obtain a plurality of temporal NLP features and (ii) the plurality of speech features is aggregated to obtain a plurality of temporal speech features. At a step 712 of the method of detecting, the plurality of temporal NLP features and the plurality of temporal speech features are aggregated to obtain first temporal aggregated features. At a step 714 of the method of detecting, a plurality of micro-expressions of the user is detected by (i) splitting extracted video signals into a plurality of short fixed-duration video signals, (ii) detecting a plurality of Region Of Interest (ROI) in the plurality of short fixed-duration video signals and (iii) comparing the plurality of detected ROI with video signals annotated with micro-expression labels that are stored in a database to detect the plurality of micro-expressions of the user in the plurality of short fixed-duration video signals. At a step 716 of the method of detecting, a gesture of the user is tracked and determined from the extracted video signals. At a step 718 of the method of detecting, the plurality of micro-expressions and the gesture of the user are aggregated to obtain second temporal aggregated features. At a step 720 of the method of detecting, the first temporal aggregated features and the second temporal aggregated features are aggregated to obtain final temporal aggregated features. At a step 722 of the method of detecting, a deception in the Audio-Video response is detected using a machine learning model based on the final temporal aggregated features.

Figure 8:
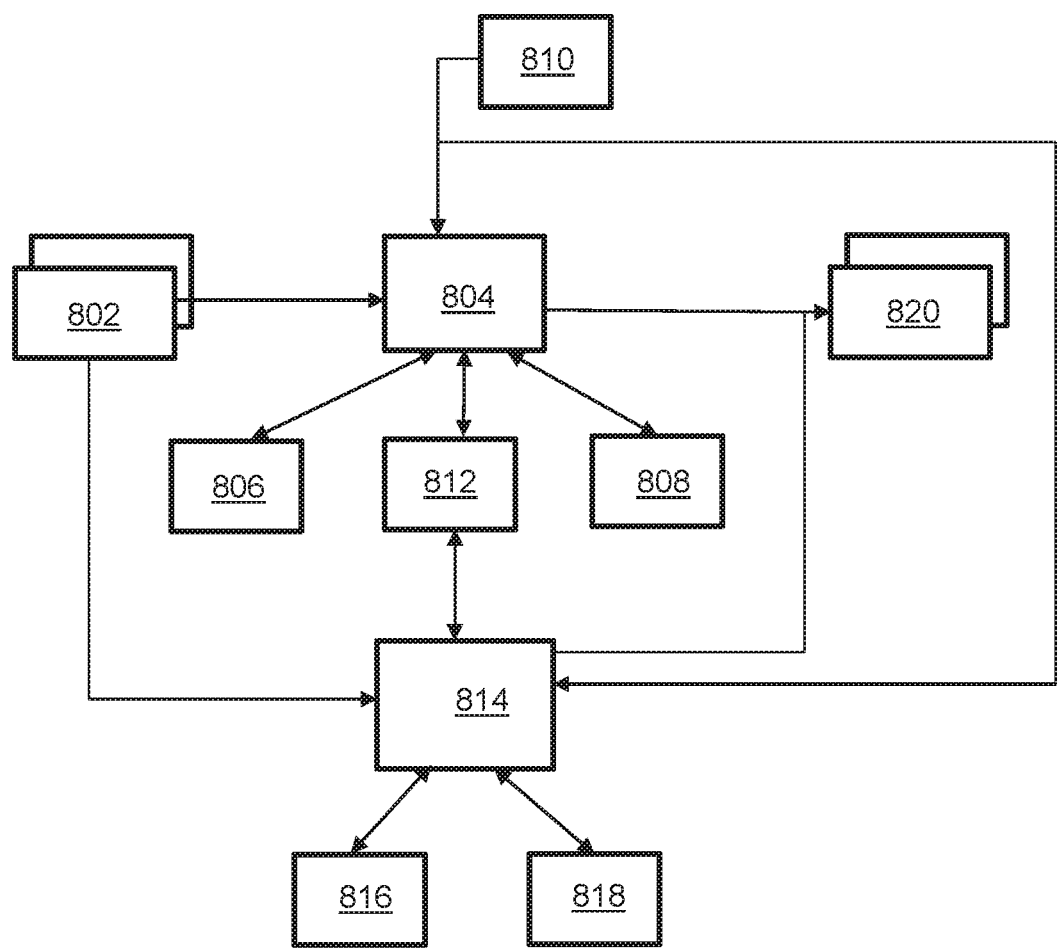
FIG. 8 is an illustration of an exploded view of a distributed computing architecture/system in accordance with an embodiment of the present disclosure.

FIG. 8 is an illustration of an exploded view of a distributed computing architecture/system in accordance with an embodiment of the present disclosure. The exploded view comprises a user device that comprises an input interface 802, a control module that comprises a processor 804, a memory 806 and a non-volatile storage 808, processing instructions 810, a shared/distributed storage 812, a server that comprises a server processor 814, a server memory 816 and a server non-volatile storage 818 and an output interface 820. The function of the processor 804, the memory 806 and the non-volatile storage 808 are thus identical to the server processor 814, the server memory 816 and the server non-volatile storage 818 respectively. The functions of these parts are as described above.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for detecting deception in an Audio-Video response of a user, using a server, in a distributed computing architecture, the method comprising:
    enabling an Audio-Video connection with a user device upon receiving a request from a user;
    obtaining, from the user device, an Audio-Video response of the user corresponding to a first set of questions that are provided to the user by the server;
    extracting audio signals and video signals from the Audio-Video response;
    detecting an activity of the user by
        determining a plurality of Natural Language Processing (NLP) features from the extracted audio signals by (i) performing a speech to text translation and (ii) extracting the plurality of NLP features from the translated text; and
        determining a plurality of speech features from the extracted audio signals by (i) splitting the extracted audio signals into a plurality of short interval audio signals and (ii) extracting the plurality of speech features from the plurality of short interval audio signals;
    aggregating (i) the plurality of NLP features to obtain a plurality of temporal NLP features and (ii) the plurality of speech features to obtain a plurality of temporal speech features;

aggregating the plurality of temporal NLP features and the plurality of temporal speech features to obtain first temporal aggregated features;

detecting a plurality of micro-expressions of the user by splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

tracking and determining a gesture of the user from the extracted video signals;

aggregating the plurality of micro-expressions and the gesture of the user to obtain second temporal aggregated features;

aggregating the first temporal aggregated features and the second temporal aggregated features to obtain final temporal aggregated features; and detecting, using a machine learning model, a deception in the Audio-Video response based on the final temporal aggregated features.

2. A method according to claim 1, wherein the method comprises preprocessing the audio and the video signals that are obtained from the user device to cancel noise from the audio and the video signals.

3. A method according to claim 1, wherein the method further comprises providing the Audio-Video response of the user to a plurality of reviewers to provide feedback on the Audio-Video response as deceptive or truthful.

4. A method according to claim 1, wherein the Audio-Video response further comprises metadata including a time at which the user provides the Audio-Video response and data on the first set of questions that are provided to the user.

5. A method according to claim 1, wherein the method further comprises
providing a second set of questions to the user using a knowledge repository; and
detecting, using the machine learning model, deception in Audio-Video response of the user corresponding to the second set of questions.

6. A method according to claim 1, wherein the machine learning model comprises a multi-modal algorithm, wherein the machine learning model is trained using (i) real-time datasets that comprises deceptive and truthful responses of one or more users, and (ii) the audio-video response from the user for the first set of questions or a feedback from a reviewer on the audio-video response of the user for the first set of questions, wherein the machine learning model is configured to receive the Audio-Video response of the user and to output as deceptive or truthful Audio-Video response.

7. A method according to claim 1, wherein the method further comprises repeating the first set of questions to the user to reinforce the deception detection by (i) compensating latency and real-time inference accuracy and (ii) turning on or off one or more modalities that modulate between more modalities and less modalities with higher fidelity of accuracy if the detected deception of the Audio-Video response corresponding to the first set of questions is not satisfied.

8. A method according to claim 7, wherein the method comprises scaling up or down the computation of each modality with respect to the user device and the server, wherein the scalability of each modality is determined based on the final temporal aggregated features extracted from the Audio-Video response.

9. A method according to claim 1, wherein the user device comprises at least one of (i) a virtual bot or (ii) an assist bot.

10. A method according to claim 1, wherein the plurality of Natural Language Processing features comprises at least one of (i) a number of words per second or (ii) a change in syntax of text.

11. A method according to claim 1, wherein the plurality of speech features comprises at least one of (i) a speech tone or (ii) a frequency change and a pause rate change of speech.

12. A method according to claim 1, wherein the plurality of micro-expressions is determined by analyzing at least one of left side eyebrows, right side eyebrows, a left upper eyelid, a left lower eyelid, a right upper eyelid, a right lower eyelid or cheek muscles of the user in the plurality of short fixed-duration video signals.

13. A method as claimed in claim 5, wherein the method further comprises storing the detected deception associated with the Audio-Video response of the user as reference data in the knowledge repository to ascertain deceptiveness of the user in future.

14. A system for detecting deception in an Audio-Video response of a user, in a distributed computing architecture, the system comprising:
a server that comprises a processor that executes a machine learning algorithm,
wherein at least one storage medium is coupled to the server and contains a knowledge repository of the user data;
at least one input interface that receives a request from a user device associated with a user and provides the request to the server to enable an Audio-Video connection between the user device and the server; and
at least one output interface that provides detected deception associated with the Audio-Video response of the user;
wherein the server provides a first set of question to the user through a user interface of the user device by interrogating the knowledge repository and receives an Audio-Video response of the user corresponding to the first set of questions through the at least one input interface to
extract audio signals and video signals from the Audio-Video response;
detect an activity of the user by:
determining a plurality of Natural Language Processing (NLP) features from the extracted audio signals by (i) performing a speech to text translation and (ii) extracting the plurality of NLP features from the translated text; and
determining a plurality of speech features from the extracted audio signals by (i) splitting the extracted audio signals into a plurality of short interval audio signals and (ii) extracting the plurality of speech features from the plurality of short interval audio signals;
aggregate (i) the plurality of NLP features to obtain a plurality of temporal NLP features and (ii) the plurality of speech features to obtain a plurality of temporal speech features;
aggregate the plurality of temporal NLP features and the plurality of temporal speech features to obtain first temporal aggregated features;
detect a plurality of micro-expressions of the user by:
splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

track and determine a gesture of the user from the extracted video signals;

aggregate the plurality of micro-expressions and the gesture of the user to obtain second temporal aggregated features;

aggregate the first temporal aggregated features and the second temporal aggregated features to obtain final temporal aggregated features; and detect, using a machine learning model, a deception in the Audio-Video response based on the final temporal aggregated features by interrogating the knowledge repository.

15. A computer program product comprising non-transitory computer readable instructions configured to cause a computing system to:

detect deception in an Audio-Video response of a user, using a server, in a distributed computing architecture by:

enabling an Audio-Video connection with a user device upon receiving a request from a user;

obtaining, from the user device, an Audio-Video response of the user corresponding to a first set of questions that are provided to the user by the server;

extracting audio signals and video signals from the Audio-Video response;

detecting an activity of the user by determining a plurality of Natural Language Processing (NLP) features from the extracted audio signals by (i) performing a speech to text translation and (ii) extracting the plurality of NLP features from the translated text; and determining a plurality of speech features from the extracted audio signals by (i) splitting the extracted audio signals into a plurality of short interval audio signals and (ii) extracting the plurality of speech features from the plurality of short interval audio signals;

aggregating (i) the plurality of NLP features to obtain a plurality of temporal NLP features and (ii) the plurality of speech features to obtain a plurality of temporal speech features;

aggregating the plurality of temporal NLP features and the plurality of temporal speech features to obtain first temporal aggregated features;

detecting a plurality of micro-expressions of the user by splitting extracted video signals into a plurality of short fixed-duration video signals;

detecting a plurality of Region Of Interest (ROI) in the plurality of short fixed-duration video signals; and comparing the plurality of detected ROI with video signals annotated with micro-expression labels that are stored in a database to detect the plurality of micro-expressions of the user in the plurality of short fixed-duration video signals;

tracking and determining a gesture of the user from the extracted video signals;

aggregating the plurality of micro-expressions and the gesture of the user to obtain second temporal aggregated features;

aggregating the first temporal aggregated features and the second temporal aggregated features to obtain final temporal aggregated features; and detecting, using a machine learning model, a deception in the Audio-Video response based on the final temporal aggregated features.

* * * * *